(12) United States Patent
Hurst et al.

(10) Patent No.: US 11,870,821 B1
(45) Date of Patent: Jan. 9, 2024

(54) CONFERENCING

(71) Applicant: West Corporation, Omaha, NE (US)

(72) Inventors: Marcus Hurst, Fremont, NE (US);
William Krasso, Valley, NE (US)

(73) Assignee: Intrado Corportation, Omaha, NE (US)

( * ) Notice: Subject to any disclaimer, the term of this patent is extended or adjusted under 35 U.S.C. 154(b) by 89 days.

(21) Appl. No.: 16/353,030

(22) Filed: Mar. 14, 2019

(51) Int. Cl.
| H04L 65/1069 | (2022.01) |
| H04L 65/1073 | (2022.01) |
| H04N 7/15 | (2006.01) |
| H04L 65/1093 | (2022.01) |

(52) U.S. Cl.
CPC ...... *H04L 65/1069* (2013.01); *H04L 65/1073* (2013.01); *H04L 65/1093* (2013.01); *H04N 7/152* (2013.01)

(58) Field of Classification Search
CPC .. H04L 65/1069; H04L 65/1073; H04N 7/152
See application file for complete search history.

(56) References Cited

U.S. PATENT DOCUMENTS

| 5,631,904 | A * | 5/1997 | Fitser | H04M 3/56 370/261 |
| 6,427,008 | B1 * | 7/2002 | Balaz | H04M 15/00 379/114.1 |
| 7,583,657 | B1 * | 9/2009 | Webster | H04L 12/1822 370/352 |
| 7,617,280 | B1 * | 11/2009 | Webster | H04L 12/1822 709/204 |
| 7,894,587 | B1 * | 2/2011 | Laurinavichus | H04M 3/5235 379/207.14 |
| 9,762,735 | B1 * | 9/2017 | Webster | H04L 12/1822 |
| 2003/0072428 | A1 * | 4/2003 | Stern | H04M 3/56 379/202.01 |
| 2008/0259824 | A1 * | 10/2008 | Frankel | H04M 3/56 370/260 |
| 2010/0220849 | A1 * | 9/2010 | Colbert | H04M 3/20 379/208.01 |
| 2012/0170726 | A1 * | 7/2012 | Schwartz | H04M 3/56 379/93.02 |
| 2018/0124237 | A1 * | 5/2018 | Broadworth | H04M 3/42068 |
| 2020/0145530 | A1 * | 5/2020 | Renner | H04M 7/0045 |

* cited by examiner

*Primary Examiner* — Chris Parry
*Assistant Examiner* — Steven C Nguyen

(57) ABSTRACT

Audio conferences between multiple participants may be conducted without preconfigured passcodes by associating a toll line with a particular conference partner. Users of a conferencing system may dial the toll line and enter a passcode. The first user to enter may enter any passcode of their choosing, such as a passcode agreed to by other conference participants. If no conference with that passcode is currently executing on the conference platform, a new conference is activated. Subsequent users who enter the same passcode are joined to the conference.

13 Claims, 5 Drawing Sheets

CONFERENCING

FIELD OF THE INVENTION

This disclosure relates to systems and methods for performing conference calls, in particular through a conferencing application.

BACKGROUND OF THE INVENTION

Conferencing applications, audio meeting applications and the like link multiple users simultaneously on a single call to facilitate a conference call between these users. Conferencing applications typically make use of a conferencing bridge. A conferencing bridge includes software at a server that is able to receive audio calls on multiple lines, mix the audio and transmit the audio out on the multiple lines so that multiple parties, i.e. three or more, can simultaneously engage in a call.

Conference attendees call a number associated with the server. To provide separation between multiple conferences hosted by the server, each conference may be allocated a certain set of resources, memory, incoming audio lines, etc. In addition, each conference is typically allocated a passcode or similar. Conference participants supply the passcode and the bridge software controls access by the participant to the resources allocated to the associated conference. The passcode is also useful for tracking of participants, hosts, and for billing purposes.

With many of today's conferencing applications the user must be a known user to the conferencing provider and must have a known code that is stored in a central database for validation purposes. The preconfigured conference and passcode enables authentication of users at the time of a conference and ensures that connecting users are joined to the correct conference.

A problem can arise when conference attendees access a conference through a conferencing partner and are not direct customers of the service provider. In such situations, there may be no input conference code or security code associated with the conference and the users may not be known to the service provider thereby making authentication and billing difficult. However, many conferencing partners desire to use the conferencing services of the conference provider.

What is required is an improved system and method for identifying users in a conferencing application.

SUMMARY OF THE INVENTION

Abstract.

In one aspect of the disclosure, there is provided a server comprising at least one processor and at least one memory operatively associated with the processor. The at least one processor may be programmed to execute a conferencing application on the server. The conferencing application may be programmed to receive a call from a first participant, prompt the first participant for a passcode, receive a passcode from the first participant, and when the received passcode is not associated with a currently executing conference at the conferencing server, commence a new conference by the conferencing application at the conferencing server and associate the received passcode with the new conference.

In one aspect of the disclosure, there is provided a method comprising receiving, by a conferencing application executing on a conferencing server, a call from a first participant, prompting the first participant for a passcode, and receiving a passcode from the first participant. When the received passcode is not associated with a currently executing conference at the conferencing server, a new conference is commenced by the conferencing application at the conferencing server and the received passcode is associated with the new conference.

In one aspect of the disclosure, there is provided a non-transitory computer readable medium comprising instructions, that when read by a processor, cause the processor to perform receiving, a call from a first participant, prompting the first participant for a passcode, and receiving a passcode from the first participant. When the received passcode is not associated with a currently executing conference at the conferencing server, a new conference is commenced by the conferencing application at the conferencing server and the received passcode is associated with the new conference.

BRIEF DESCRIPTION OF THE DRAWINGS

Reference will now be made, by way of example only, to specific embodiments and to the accompanying drawings in which.

DETAILED DESCRIPTION OF THE INVENTION

In a typical conferencing or audio meeting application, conference resources are configured prior to the scheduled meeting time. Typically, a conference host will request resources from a conferencing service provider. The conference service provider may allocate resources based on the number of likely users etc. and assign a passcode or conference code to the conference. The conference code is stored at the conferencing server and is communicated to potential participants. At the time of the conference, participants supply the conference code which is checked against the stored conference code. If conference code is authenticated, the participant is moved into the conference. The conference code can be used for tracking users and the conference host for control and billing purposes.

However, as noted above, there may be times when conferencing partners may wish to conduct conferences for their clients and customers. In such situations, it can be difficult to pre-configure conference codes by the service provider. Furthermore, because the clients and customers are not direct customers of the service provider, it can be difficult to know who the direct users of the conferencing application are for tracking and billing purposes.

Figure 1:
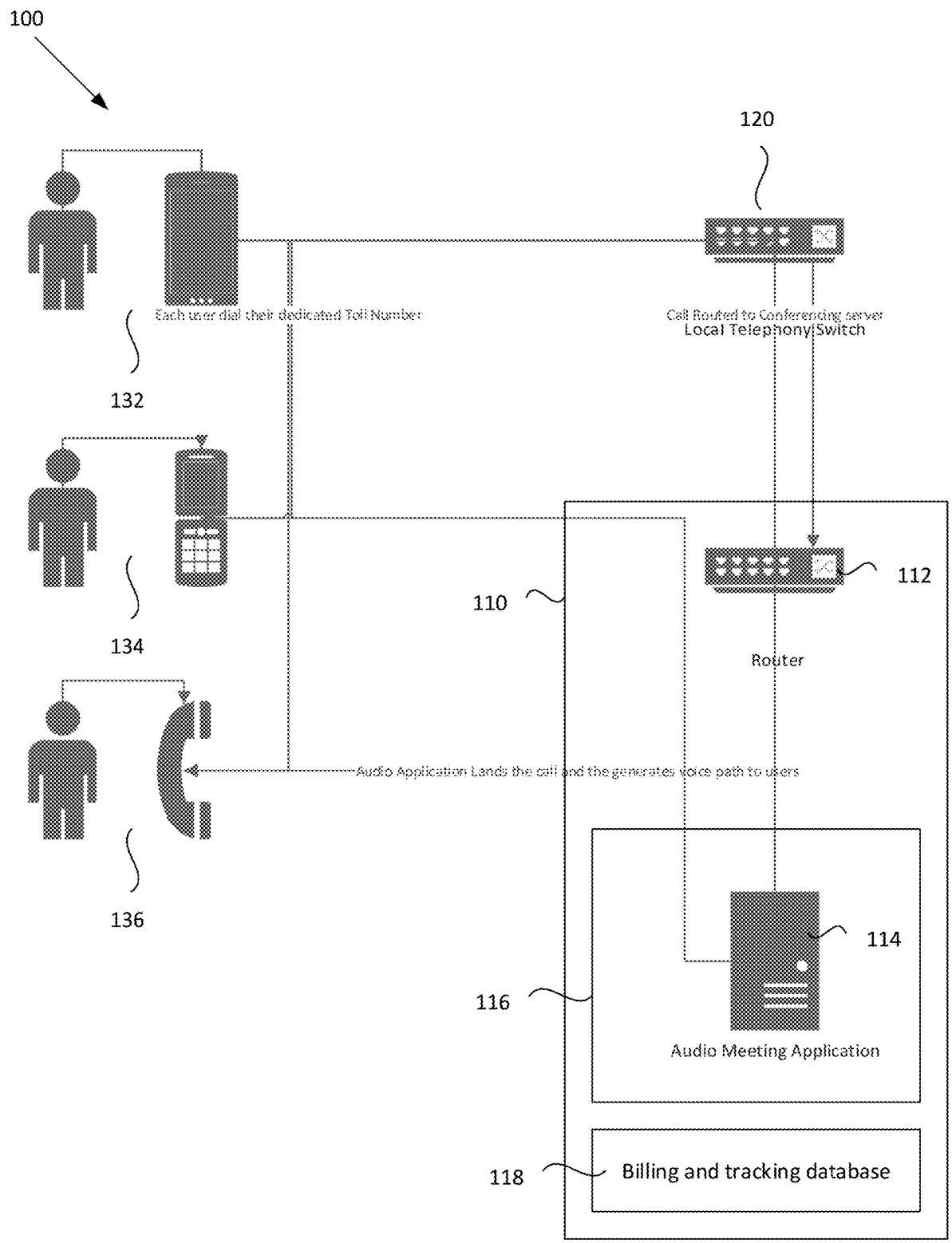
FIG. 1 shows a schematic of a network diagram for conducting an audio conference.

A system for conducting a conference in accordance with an embodiment of the present disclosure is depicted in FIG. 1. The system 100 includes a router 112 and conferencing application 114 that executes on a conferencing server 116 within a conferencing network 110. The system 100 further includes a generic telephony switch 120 of a telephony network which may be a mobile network or a conventional PSTN network. Multiple users, which may include computer users 132, mobile device users 134 or landline users 136 access the telephony switch 120 through known telephony techniques, include conventional landline telephone, mobile networks, or internet based systems such as Voice Over IP (VOIP). The specific aspects of the telephony system are not considered pertinent to the present disclosure and all telephony types and the hardware and software for their implementation are considered to be known to the person skilled in the art.

Figure 2:
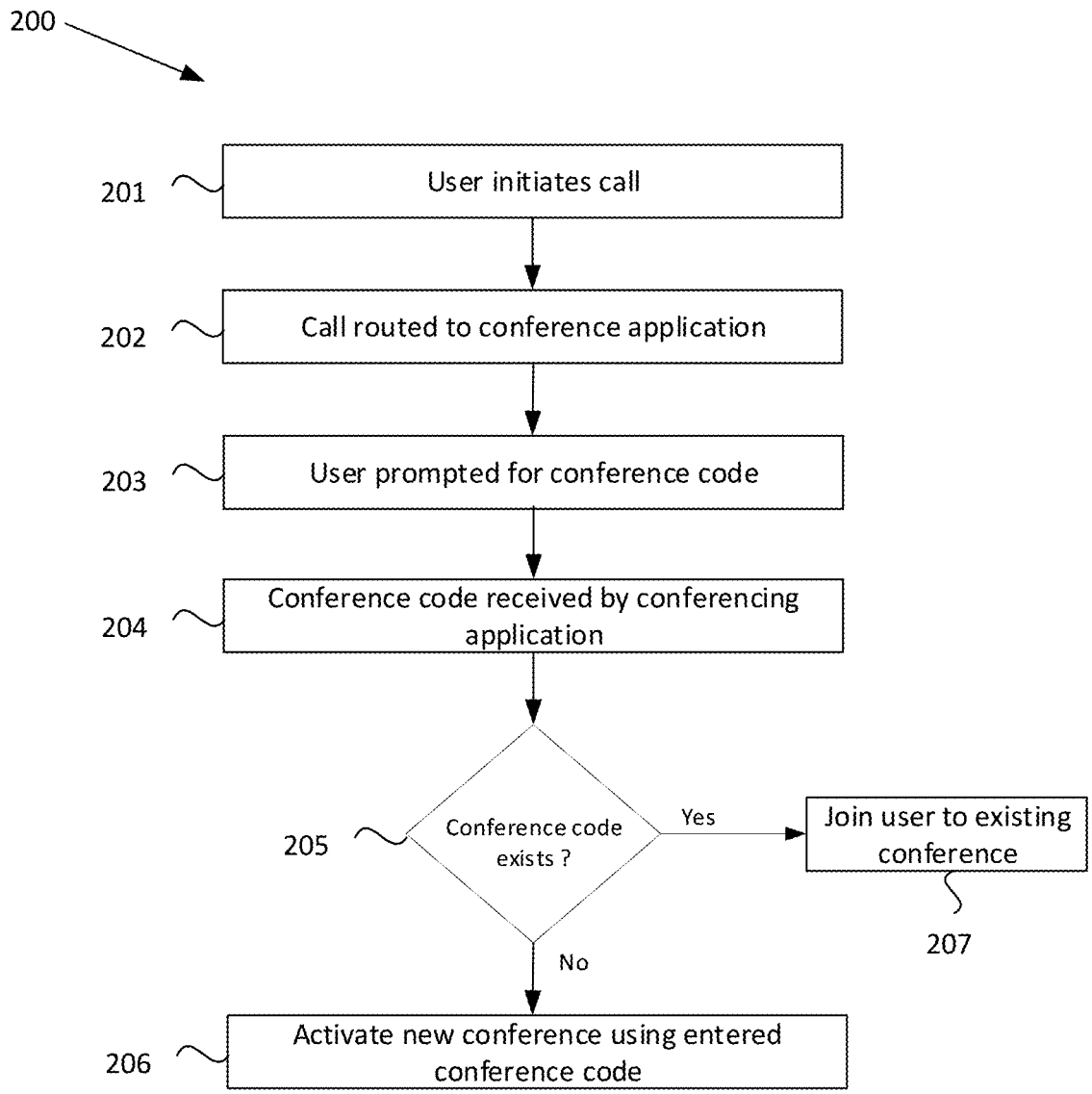
FIG. 2 shows a flowchart of a teleconference process.

A method for conducting a conference on the system 100 is depicted in the flowchart 200 of FIG. 2. At step 201, a first participant, i.e. one of the users 132, 134, 136 initiates a call. The call is switched from the telephony switch into the conferencing network 110 where the router 112 routes the call to the conferencing application 114 (step 202). The conferencing application 114 executing on the conferencing server 116 receives the call from the first participant and prompts the participant for a passcode 203. The application receives a passcode from the first participant 204 and determines whether a conference pertaining to that passcode is already in progress on the conferencing server 205. For example, the conferencing application may check a database 118 that is operatively connected to the conferencing server 116.

Unlike a prior art system where an unrecognized passcode would result in rejection of the user or a request to re-enter a valid passcode, in the present embodiment, when the received passcode is not associated with a currently executing conference at the conferencing server, the application responds by commencing a new conference at the conferencing server 206 and associating the received passcode with the new conference. Alternatively, if the conference code does exist, meaning that there is a currently executing conference with that passcode, then the user is joined to the existing conference 207.

If a subsequent user dials into the conferencing server and submits the same passcode, the subsequent user is joined to the new conference.

The conferencing application may be registered for a Dialed Number Identification Service (DNIS) with the telephony service provider. The conferencing application may thus receive the dialed number from telephony switch 120. The identified dialed number may be used by the conferencing server to separate different conferences of different entities. Since the DNIS is an owned entity, the conferencing application may be programmed to associate the owner of the DNIS as the party requesting to utilize the conferencing application. The DNIS owner thus represents a billable entity.

Figure 3:
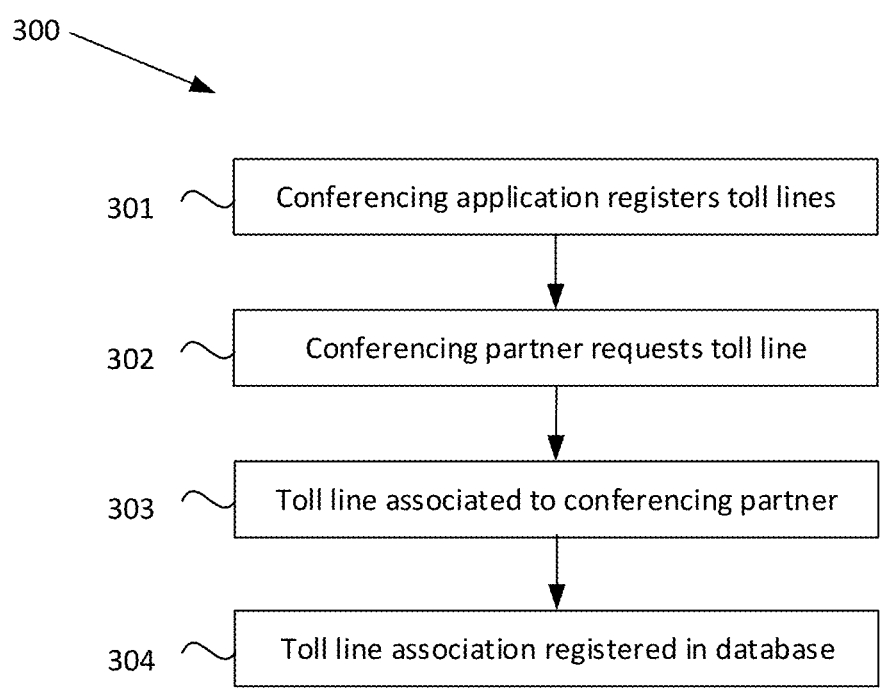
FIG. 3 shows a flowchart of a registration process.

FIG. 3 shows a flowchart 300 of a process for initializing the conferencing application. At step 301, the conferencing application registers a plurality of toll lines with a telephony service provider. The toll lines may be, for example, 800 or 900 numbers, though this is not essential. At step 302, a conferencing partner may request a toll line from the conferencing application. A toll number may be assigned to the conferencing partner (step 303) and an association between the conferencing partner and the toll line may be registered in the database 118 (step 304). The association may be subsequently used for billing and tracking by the conferencing application when calls are received by the conferencing application on the registered toll line number. That is, from a billing perspective, all users calling the specific DNIS belongs to that specified DNIS owner.

Though the DNIS being identified and recognized may be sufficient for tracking and billing, many existing conferencing applications require an input code in order to initiate a conference and join participants to the conference. Thus, the conferencing application maintains a requirement for an input passcode, even though there may be no preconfigured passcodes stored in the conferencing system. In one embodiment, the application may be programmed to require a conference code between three and sixteen digits in length. Since for billing and tracking it is only necessary to know the DNIS owner, the conferencing application may be programmed to accept any conference code received on the specific DNIS. When the application receives from a user a conference code that does not currently exist, i.e. no currently executing conference with that associated code, then the application starts a new conference. Or, if the conference code does exist, then the caller is joined to the conference. The conferencing application distinguishes conferences firstly by their DNIS, thus the same conference code may be used concurrently on different toll lines hosted by the conference application.

Figure 4:
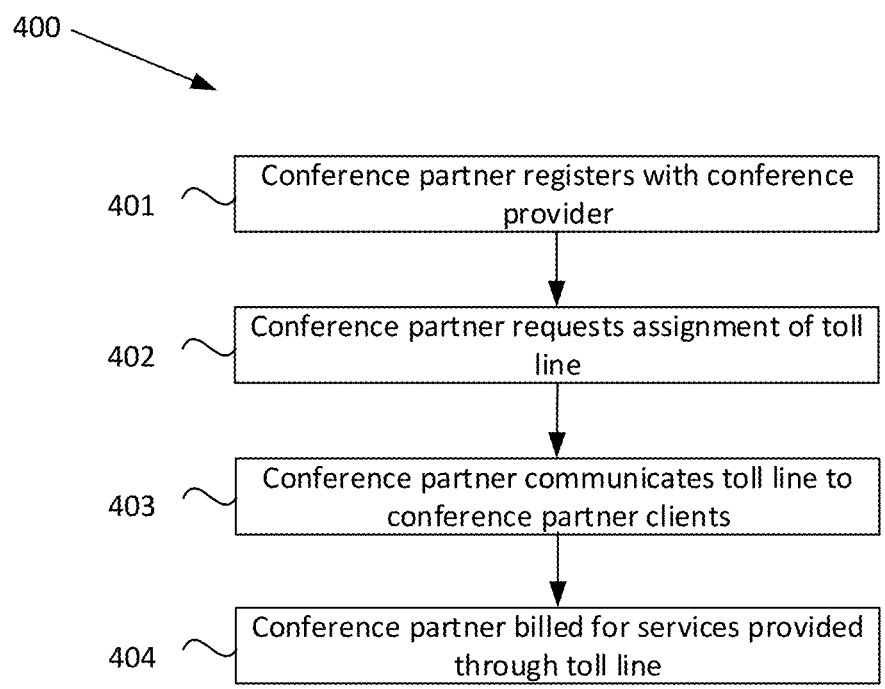
FIG. 4 shows a flowchart of a process for a conference partner.

FIG. 4 shows a process flow for a conferencing partner, i.e. DNIS owner, utilizing the conferencing system. The conferencing partner may register with the conference provider, including providing billing details (step 401). The registered partner may then request assignment of a toll line registered to the conference provider (step 402). The conferencing partner may then notify users, clients, customers etc. of the conferencing partner of the toll line (step 403). Those users, clients and customers may then use the toll line to conduct their own conferences at a time of their choosing using passcodes that they select themselves. The conference parameters, with the exception of the DNIS, do not need to be registered or preconfigured with the conferencing system 120. The conference partner can be billed for services provided via the toll line DNIS (step 404).

The conference participants can organize conferences amongst themselves at a time of their choosing. Typically, one party will invite others to a conference at a specified time using a specified passcode. The party may communicate details of the conference including the DNIS toll line, passcode that the party has chosen, date and time. At the specified time all invited participants dial the same DNIS and are connected to the conferencing application. The application will prompt the callers to input the conference code. The application will take the conference code and first check to see if a conference already exists for that code and if there is one the caller will be joined directly to that conference. However, if there is no conference running for the conference code input then the application will create a new conference and join the caller to that conference. There are only a few basic features like the ability to mute your line available for the conference. There may be timers so that if only the one participant joins and stays on the call for a preconfigured time, e.g. 30 minutes, then they will be played a messages that the minimal number of users is not present and the conference will be terminated. There are no dial-out capabilities so the users are not able to call other users to join the conference. Once the conference ends then the conference code is available for the next user to utilize the same conference code. There are no reservations of the conference code and there are no recurring meetings allowed to be scheduled for the same conference code. These codes are a one-time use code and then made available to be used again by the first person to select that given conference code; e.g. 1234.

The system and methods described by the present embodiments requires that if a business entity or a partner provider wants to utilize the conferencing system, then each entity or partner must have their own single dedicated DNIS so that only their users can utilize this service. Of course, entities may be associated with multiple DNIS numbers.

In one embodiment, the conferencing application may be able to customize the greeting and the user experience based upon the DNIS. Thus, when a call is received on a particular DNIS, the application identifies the DNIS and any customized parameters. If customized parameters exist, such as a customized greeting, Interactive Voice Response (IVR) menu, etc. then the customized greeting is played to the caller.

In various embodiments, a simple call flow allows anyone to dial a specific number and input any meeting code to start or join that meeting. In one embodiment, the call flow is intended as a consumer product but could also be utilized by companies for quick meetings. To reduce the fraudulent usage there would be a single toll number for a company or a single toll number for all consumers to utilize based upon their geographical region.

The basis to this product is to set up a dedicated toll based upon the audience utilizing the service and create a mechanism where an audio only meeting can be started based upon an input meeting code and allow the user to input basically any meeting code they desire without a design constraint, such as being between five to sixteen digits in length. This would give the users enough of a range of numbers that they could choose, which should reduce the number of clashes with others choosing the same numbers. Because there is no known users the first person to utilize a given code would mean anyone using the code would either start the meeting, if the first one in, or would be joining the existing meeting, if not the first. If a user did join a meeting that was not meant for them they would simply hang-up and choose a different number sequence and try again. The user starting the meeting is responsible for sending the meeting code to all the participants the user would like to have in their meeting. The call flow would simply be a greeting and a prompt to enter the code for the meeting. The code entered would activate the conference and move participants into the meeting.

In one embodiment, the product may be utilized for very quick meetings that anyone on an audio line can join and may not have the security or pricing of traditional audio conferencing applications. Thus, the product may be more suited for those consumers that may want to keep track or keep in touch with relatives or those in another country without having to pay the prices of international calls. Each participant joining the meeting is responsible for their own audio costs to join the meeting.

When this service is utilized by a company then a separate dedicated toll number could be setup for this service that would only be available for their employees and in this case the company owning the toll number would be responsible for all the billing associated with the different meeting invitees. In various embodiments, the billing may be either a total per-minute charge per line or a direct billing to each ANI captured. To ensure that ANIs are captured any caller whose ANI is blocked from presentation or silent would be rejected from joining the meeting.

For consumers there would be a separate dedicated toll number set up based as required either by area, state, or any number of parameters to ensure the smallest groups and areas are covered and services with as few clashes as possible.

For the call flow there may be a greeting based upon the group that service is provided to and a prompt to enter the meeting code. The only feature that would be offered as part of the call flow would be the ability for each participant to mute their line. There would really be no concept of a host to the meeting as the first to join the meeting would activate the meeting room. In some embodiments, there would be no ability to dial out to other participants, unlike for prior art conferencing applications, as all participants must dial-in to the toll number with a valid ANI that could be captured for usage and billing purposes.

Depending upon the usage and areas defined the call flow clip for mute and unmuting and the greeting clip could be in any language supported globally.

For each company that may want to offer this service to their employees there would be a dedicated Toll number setup for each company. The number would have a greeting associated with the company utilizing the service. Within the server, there may be separation between toll numbers. Thus, a first user of a first company may start a conference with Passcode 1234 by dialing a first toll number assigned to the first company. If a second user of a second company dials a different toll number to access the server but enters a Passcode of 1234, the server will start a new conference for the second user.

Caller Detail Records (CDRs) could be generated for each caller joining into the meeting. These records would be utilized to bill for the service. There are numerous billing models that could be utilized for the service, including, without limitation, those discussed above, and may be determined based upon the type of users and location of the users.

In one embodiment, the conferencing system may be utilized by competitor conferencing entities to overcome infrastructure failures or service outages. Since the solution is solely DNIS and Passcode based per company or whoever owns the DNIS, the service could be utilized by a competitor or other conference provider when their services become unavailable. By simply dialing a Toll Number for that provider they could give the DNIS to their conference users and allow them to hold their meetings utilizing the conferencing system platform. The owning company would not have to share any client or user information and could simply give the Toll Number to their users and instruct them to put in a Passcode that meets their needs. The longer the number of digits in the passcode, the more security would be available as most will not utilize longer Passcodes; e.g. fourteen to sixteen digits in length.

This would be a temporary solution to the providers' infrastructure not being available or at 100 percent.

Figure 5:
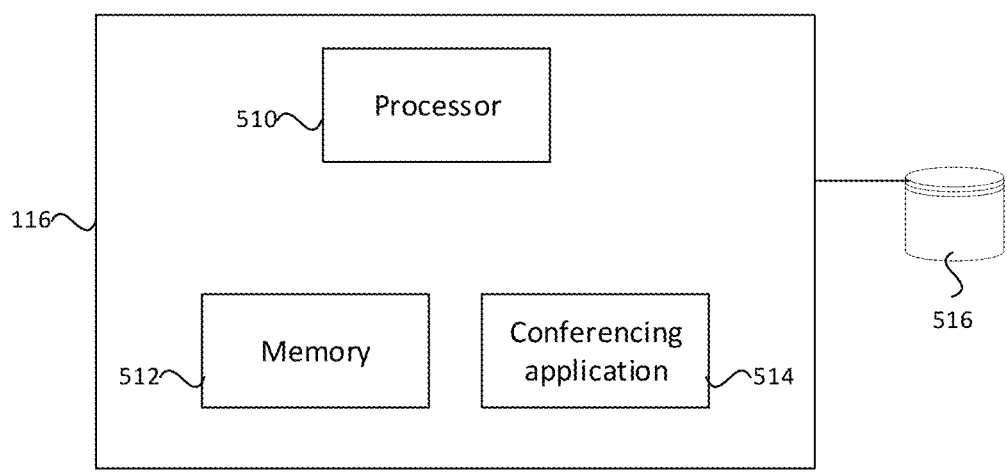
FIG. 5 shows a processor and memory for executing a conferencing process.

The components of the conferencing system may be embodied in hardware, software, firmware or a combination of hardware, software and/or firmware. In a hardware embodiment, as shown in FIG. 5, the conferencing application may be executed on one or more processors 510 of the server 116 that is operatively associated memory 512, which may include memory for storing data, program code, etc. as well as memory for use in programmatically executing instruction sets, code etc. In particular, the conferencing application 514 may be stored in the memory 512 and executed by the one or more processors 510. The server 116 may be in communication with one or more databases 516, for example a database that stores conference partner registrations, toll line associations, etc. as described herein above.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A server comprising:
   at least one processor; and
   at least one memory storing instructions that when executed by the at least one processor cause the at least one processor to execute a conferencing application to:
   identify dialed number identification service (DNIS) information corresponding to each conference of a plurality of different conferences each having different DNIS information;
   assign call numbers to parties requesting services provided by the conferencing application;
   receive calls from a plurality of first participants corresponding to the plurality of different conferences using corresponding call numbers;
   receive a same passcode from each first participant of the plurality of first participants, wherein each of the plurality of first participants correspond to different conferences;
   associate each of the same passcodes with a corresponding conference, of the plurality of different conferences, based on the corresponding DNIS information;
   identify that a received passcode is not associated with a corresponding conference, of the plurality of different conferences, currently executing at the server;
   commence a new conference at the server in response to the identification; and
   associate the received passcode with the new conference.

2. The server of claim 1, wherein the conferencing application further is to:
   receive a call from a second participant;
   receive the same passcode from the second participant; and
   join the second participant to a conference having corresponding DNIS information.

3. The server of claim 1, wherein the same passcode received from each first participant, of the plurality of first participants, is selected by the party or by each first participant and wherein the party or each first participant is different from a conference provider.

4. The server of claim 1, wherein the conferencing application further is to:
   execute an Automatic Number Identification (ANI) service to capture an origination number of each first participant of the plurality of first participants.

5. The server of claim 1, wherein the conferencing application further is to:
   block any participant from the new conference for whom an origination number cannot be determined by an Automatic Number Identification (ANI) service.

6. A method for initiating a conference call using a conferencing application executing on a server, the method comprising:
   identifying, by the conferencing application, dialed number identification service (DNIS) information corresponding to each conference of a plurality of different conferences each having different DNIS information;
   assigning, by the conferencing application, call numbers to parties requesting services provided by the conferencing application;
   receiving, by the conferencing application, calls from a plurality of first participants corresponding to the plurality of different conferences using corresponding call numbers;
   receiving, by the conferencing application, a same passcode from each first participant of the plurality of first participants, wherein each of the plurality of first participants correspond to different conferences;
   associating each of the same passcodes with a corresponding conference, of the plurality of different conferences, based on the corresponding DNIS information;
   identifying, by the conferencing application, that a received passcode is not associated with a corresponding conference, of the plurality of different conferences, currently executing at the server;
   commencing, by the conferencing application, a new conference at the server in response to the identifying; and
   associating, by the conferencing application, the received passcode with the new conference.

7. The method of claim 6, comprising:
   receiving a call from a second participant;
   receiving the same passcode from the second participant; and
   joining the second participant to a conference having corresponding DNIS information.

8. The method of claim 6, comprising:
   executing an Automatic Number Identification (ANI) service to capture an origination number of each first participant of the plurality of first participants.

9. The method of claim 6, comprising:
   blocking any participant to the new conference for whom an origination number cannot be determined by the ANI service.

10. A non-transitory computer readable medium storing instructions that when executed by a processor of a server, cause the processor to perform:
    identifying dialed number identification service (DNIS) information corresponding to each conference of a plurality of different conferences each having different DNIS information;
    assigning call numbers to parties requesting services provided by the conferencing application;
    receiving a from a plurality of first participants corresponding to the plurality of different conferences using corresponding call numbers;
    receiving a same passcode from each first participant of the plurality of first participants, wherein each of the plurality of first participants correspond to different conferences;
    associating each of the same passcodes with a corresponding conference, of the plurality of different conferences, based on the corresponding DNIS information;

identifying that a received passcode is not associated with a corresponding conference, of the plurality of different conferences, currently executing at the server;

commencing a new conference at the server in response to the identifying; and associating the received passcode with the new conference.

11. The non-transitory computer readable medium of claim 10, wherein the instructions further cause the processor to perform:

receiving a call from a second participant;

receiving the same passcode from the second participant; and joining the second participant to a conference having corresponding DNIS information.

12. The non-transitory computer readable medium of claim 10, wherein the instructions further cause the processor to perform:

executing an Automatic Number Identification (ANI) service to capture an origination number of each first participant of the plurality of first participants.

13. The non-transitory computer readable medium of claim 12, wherein the instructions further cause the processor to perform:

blocking any participant from the new conference for whom an origination number cannot be determined by the ANI service.

\* \* \* \* \*